United States Patent
Lee et al.

(10) Patent No.: US 7,257,330 B2
(45) Date of Patent: Aug. 14, 2007

(54) DUOBINARY OPTICAL TRANSMISSION APPARATUS USING A SEMICONDUCTOR OPTICAL AMPLIFIER

(75) Inventors: Gyu-Woong Lee, Suwon-shi (KR); Sung-Kee Kim, Suwon-shi (KR); Seong-Taek Hwang, Pyongtaek-shi (KR); Yun-Je Oh, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 644 days.

(21) Appl. No.: 10/691,359

(22) Filed: Oct. 22, 2003

(65) Prior Publication Data

US 2004/0228637 A1 Nov. 18, 2004

(30) Foreign Application Priority Data

May 16, 2003 (KR) ............... 10-2003-0031159

(51) Int. Cl.
*H04B 10/04* (2006.01)
*H04B 10/12* (2006.01)
*G02F 1/01* (2006.01)
*G02F 1/03* (2006.01)

(52) U.S. Cl. ............... 398/183; 398/188; 398/198; 359/248; 359/279

(58) Field of Classification Search ............... 398/182, 398/183, 198, 188; 359/237, 238, 248, 279
See application file for complete search history.

(56) References Cited

U.S. PATENT DOCUMENTS

| 6,388,786 | B1 | 5/2002 | Ono et al. | ............ 359/181 |
| 6,563,623 | B1 | 5/2003 | Penninckx et al. | ......... 359/183 |
| 6,623,188 | B1 * | 9/2003 | Dimmick et al. | ........... 398/182 |
| 6,865,348 | B2 * | 3/2005 | Miyamoto et al. | .......... 398/183 |

* cited by examiner

*Primary Examiner*—M. R. Sedighian
(74) *Attorney, Agent, or Firm*—Cha & Reiter, LLC (57) ABSTRACT

Disclosed is a duobinary optical transmission apparatus using a semiconductor optical amplifier (SOA). The duobinary optical transmission apparatus includes a light source for generating a carrier wave; a duobinary precoder for encoding an input (non return to zero) electric signal; a semiconductor optical amplification unit to amplify the encoded signal from the duobinary precoder, wherein the amplification unit receives an optical amplification gain difference that varies with a bias current combined with the encoded signal; and an optical band pass filter for receiving a phase-modulated optical signal from the semiconductor optical amplification unit, filtering the received optical signal to a prescribed bandwidth, and thereby generates a duobinary optical signal.

8 Claims, 9 Drawing Sheets

DUOBINARY OPTICAL TRANSMISSION APPARATUS USING A SEMICONDUCTOR OPTICAL AMPLIFIER

CLAIM OF PRIORITY

This application claims priority to an application 10/691,359 entitled "DUOBINARY OPTICAL TRANSMISSION APPARATUS USING SEMICONDUCTOR OPTICAL AMPLIFIER (SOA)," filed in the Korean Intellectual Property Office on May 16, 2003 and assigned Ser. No. 2003-31159, the contents of which are hereby incorporated by reference.

BACKGROUND OF THE INVENTION

1. Field of the Invention

The present invention relates to a duobinary optical transmission apparatus using a duobinary optical transmission technique, and more particularly to a duobinary optical transmission apparatus using a semiconductor optical amplifier (SOA).

2. Description of the Related Art

In general, a dense wavelength division multiplexing (DWDM) optical transmission system transmits an optical signal using a single optical fiber in such a way that it enhances transmission efficiency. The optical signal comprises of a plurality of channels having different wavelengths. Also, the DWDM optical transmission system is widely used for superhigh-speed Internet networks. Such systems have a rapidly increasing data transfer quantity because it transmits optical signals irrespective of the transfer rate. Recently, systems for transmitting more than 100 channels via a single optical fiber using DWDM optical transmission methods have been commercially produced. In addition, other systems that simultaneously transmit more than 200 channels (each channel having a transfer rate of 40 Gbps) to accomplish a transfer rate of more than 10 Tbps are under development.

Such systems accommodate rapidly increasing data traffic as well as transfer requests for high-speed data transmissions of more than 40 Gbps. However, conventional optical intensity modulation methods using an non-return to zero (NRZ) method has a number of limitations. For example, one limitation is in increasing the transfer quantity because an abrupt interference and distortion between channels occurs in a prescribed zone less than a channel interval of 50 GHz. Further, nonlinear characteristics and dispersion are caused by propagating DC frequency components of a conventional binary NRZ transmission signal and high-frequency components spreading in the modulation procedure. Thus, the transmission distance is limited at high-speed transfer rates over 10 Gbps.

Recently, an optical duobinary technique has been intensively researched for obviating the transmission distance limitation caused by chromatic dispersion. The optical duobinary technique reduces the width of the transmission spectrum more than a general binary transmission method. The transmission distance in a dispersion limitation system is inversely proportional to a square of the transmission spectrum bandwidth. For example, when the transmission spectrum bandwidth is reduced by half, the transmission distance increases by four times. Also, a carrier wave frequency is suppressed in a duobinary transmission spectrum. This suppression reduces the limitations in output optical power caused by Brillouin Scattering stimulated in an optical fiber.

Figure 1:
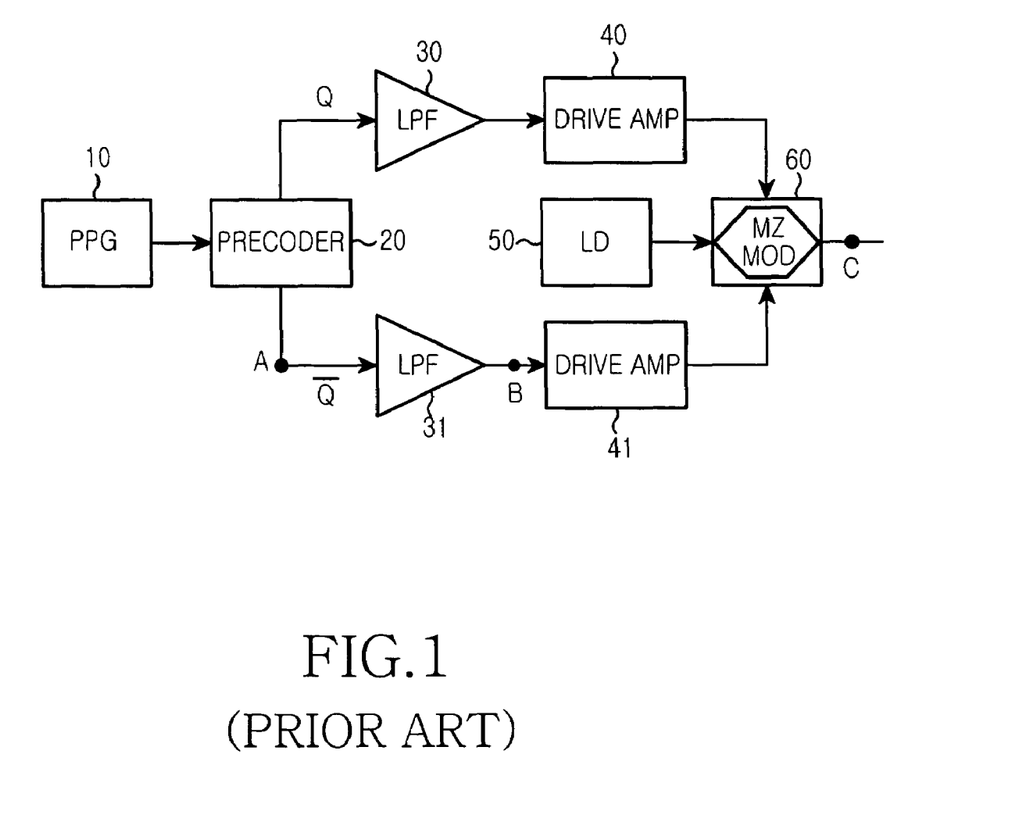
FIG. 1 is a block diagram of a conventional duobinary optical transmission apparatus.
Figure 2A:
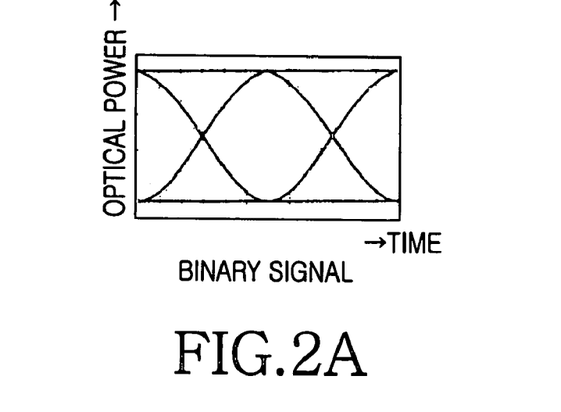
FIGS. 2a-2c are eye-diagrams of output signals at A, B and C nodes shown in FIG. 1, respectively.
Figure 2B:
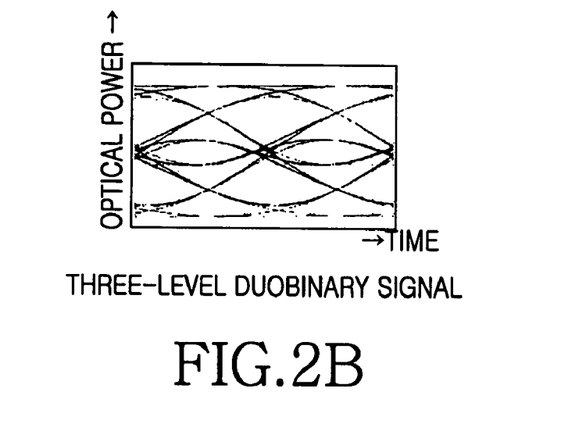
Figure 2C:
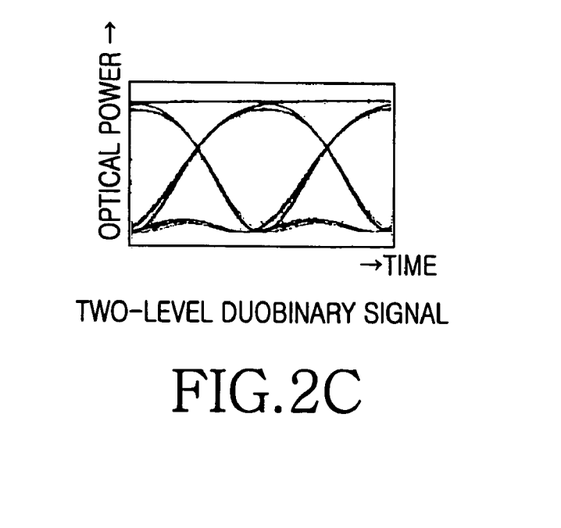

FIG. 1 is a block diagram of a conventional duobinary optical transmission apparatus. FIGS. 2a-2c are illustrate eye-diagrams of output signals at A, B and C nodes shown in FIG. 1, respectively.

Referring to FIG. 1, a conventional duobinary optical transmission apparatus includes a pulse pattern generator (PPG) 10 for generating a two-level NRZ electric pulse signal, a precoder 20 for encoding the two-level NRZ electric signal, low pass filters (LPFs) 30 and 31 for converting the two-level NRZ electric signal received from the precoder 20 into a three-level electric signal, and reducing the bandwidth of the three-level electric signal, drive amplifiers 40 and 41 for amplifying the three-level NRZ electric signal, and generating an optical modulator driving signal, a laser source 50 for generating a carrier wave; and a Mach-Zehnder-interferometer-type optical intensity modulator (MZ MOD) 60.

The two-level electric pulse signals generated by the PPG 10 are encoded by the precoder 20. An output eye-diagram at a node A is shown in FIG. 2a.

The two-level binary signal generated from the precoder 20 is transmitted to the LPFs 30 and 31. The LPFs 30 and 31 each have a bandwidth corresponding to about ¼ of a clock frequency of the two-level binary signal. This excessive bandwidth restriction causes interference between codes, and the two-level binary signal is converted into a three-level duobinary signal resulting from this interference between codes. An output eye-diagram at a node B is shown in FIG. 2b.

The three-level duobinary signal is amplified at the drive amplifiers 40 and 31, and the amplified three-level duobinary signal is used as a driving signal of the Mach-Zehnder-interferometer-type optical intensity modulator (MZ MOD) 60. The carrier wave generated from the laser source 50 modulates its own phase and its own optical intensity according to the driving signal of the MZ MOD 60. A two-level optical duobinary signal is thus generated. An output eye-diagram at a node C is shown in FIG. 2C.

Referring to FIG. 1, a reference character $\overline{Q}$ indicates an inverted signal of a signal Q. The signals Q and $\overline{Q}$ are respectively transmitted to a positive electrode (+) and a negative electrode (−) of the MZ MOD 60 with a dual electrode structure through the LPFs 30 and 31 and the drive amplifiers 40 and 41.

In this way, the MZ MOD 60 is classified into a Z-cut type MZ MOD and an X-cut type MZ MOD according to its own electrode structure. Referring to FIG. 1, the Z-cut type MZ MOD has a dual electrode and connects both of its own arms to the drive amplifiers 40 and 41 and the LPFs 30 and 31. This connection enables a three-level electric signal to be applied to each of the electrodes of the Z-cut type MZ MOD. Although the X-cut type MZ MOD, which has a single electrode, is not shown in the drawings, it connects one of its own arms to a drive amplifier and a LPF in order to transmit a three-level signal to one electrode.

However, such conventional duobinary transmission apparatuses are greatly affected by a pseudo random bit sequence (PRBS) because they generate a three-level electric signal using a LPF. Deterioration in the transmission characteristics increases with longer lengths of a PRBS. Thus, the overall system suffers. In particular, the system margin is greatly reduced for a $2^{31}-1$ PRBS than a $2^{7}-1$ PRBS. Typically, the slope along a signal's level change from a 0-level to a 1-level is different from the slope along a signal's level change from the 1-level to the 0-level. However, a duobinary optical transmission apparatus using LPFs suffers from increased jitters of the output waves since portions having different slopes are mutually summed, such that a first signal transition from 0-level to 1-level and a second signal transition from 1-level to 0-level are performed. This jitter problem is generated in both in the conventional Z-cut type or X-cut type structure. The dependency of such signal patterns limits the optical transmission operation.

Figure 3:
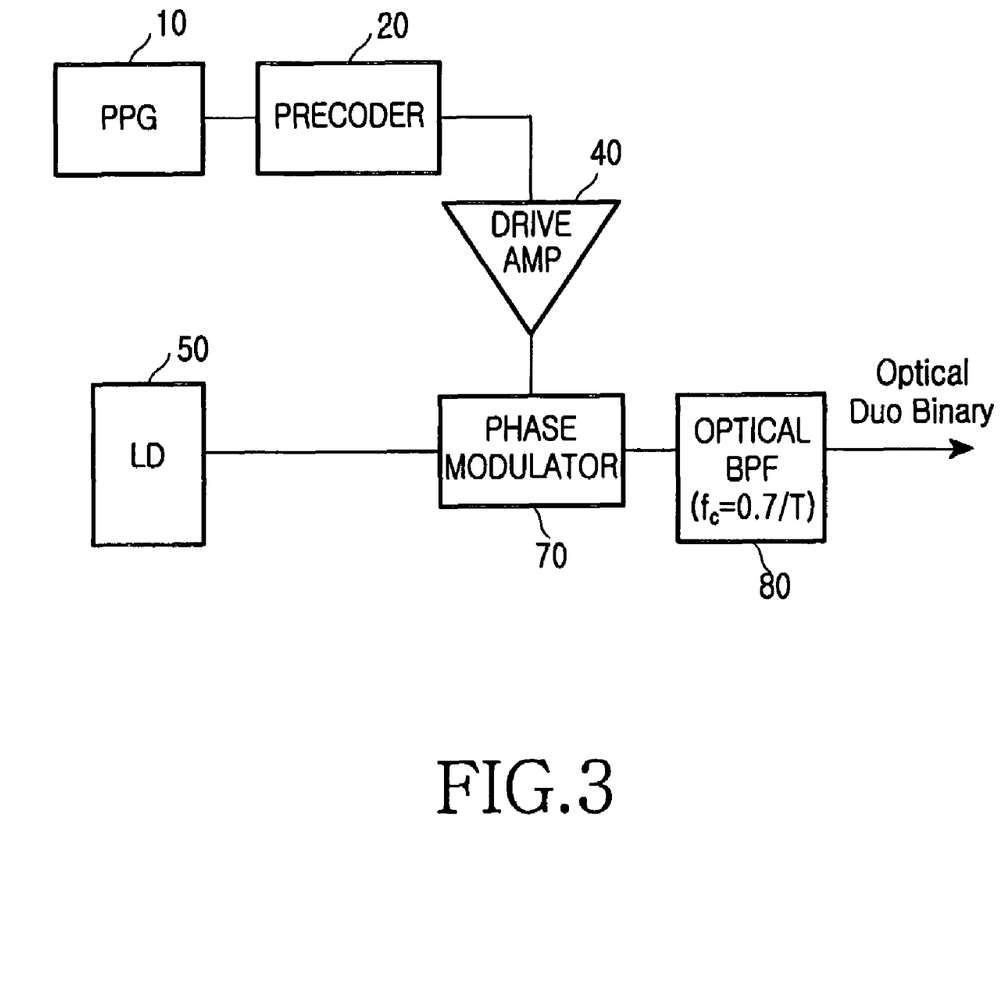
FIG. 3 is a block diagram of another conventional duobinary optical transmission apparatus.

In order to obviate the aforementioned problem, a structure without an electric LPF has been proposed. FIG. 3 is another conventional duobinary optical transmission apparatus using both a phase modulator and an optical band pass filter (BPF). Referring to FIG. 3, the PPG 10, a precoder 20, a modulator drive amplifier 40, and a laser source 50 are similar to those of FIG. 1. Such a duobinary optical transmission apparatus generates signals similar to duobinary optical output signals of FIG. 1 using a phase modulator 70 and an optical BPF 80 instead of an electric LPF.

Although, the aforementioned duobinary optical transmission apparatus guarantees a predetermined transmission quality according to the length of a PRBS, it must use a very expensive phase modulator. Consequently, the production cost of a transmitter is increased.

SUMMARY OF THE INVENTION

Therefore, the present invention has been made to reduce or overcome the above problems. One object of the present invention is to provide a duobinary optical transmission apparatus using a semiconductor optical amplifier. The apparatus solves not only the dependency of transmission quality corresponding to filter transmission characteristics but also the dependency of bit patterns of a conventional duobinary optical transmitter. It also enhances nonlinear and dispersion characteristics of NRZ transmission.

In accordance with the principles of the present invention, a duobinary optical transmission apparatus using a semiconductor optical amplifier is provided, comprising a light source for generating a carrier wave; a duobinary precoder for encoding an input (non return to zero) electric signal; a semiconductor optical amplification unit to amplify the encoded signal from the duobinary precoder, wherein the amplification unit receives an optical amplification gain difference that varies with a bias current combined with the encoded signal; and an optical band pass filter for receiving a phase-modulated optical signal from the semiconductor optical amplification unit, filtering the received optical signal to a prescribed bandwidth, and thereby generates a duobinary optical signal.

Preferably, the semiconductor optical amplification unit may include semiconductor optical amplifier (SOA), and a DC coupling line for providing the SOA with a bias current.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted when it may make the subject matter of the present invention unclear.

Figure 4:
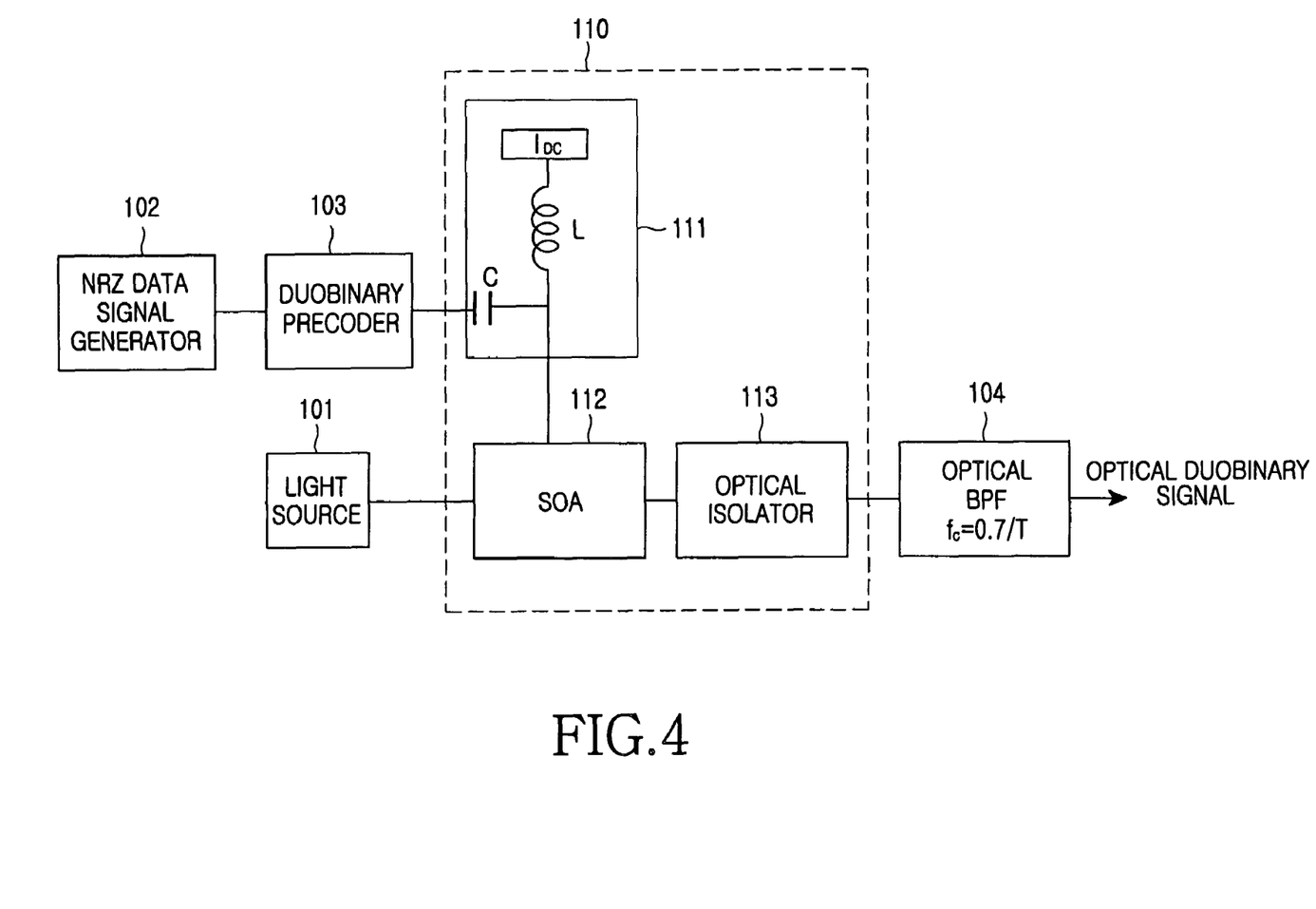
FIG. 4 is a block diagram of a duobinary optical transmission apparatus in accordance with a preferred embodiment of the present invention.

FIG. 4 is a block diagram of a duobinary optical transmission apparatus in accordance with a preferred embodiment of the present invention.

Referring to FIG. 4, a duobinary optical transmission apparatus includes a light source 101 for generating a carrier wave; a signal generator for generating NRZ electric signals; a duobinary precoder 103 for encoding the NRZ electric signals; a semiconductor optical amplification unit 110 for receiving a gain difference varying with a bias current combined with the encoded signal, and modulating a phase of the optical carrier wave on the basis of the received gain difference; and an optical BPF 104 for receiving a phase-modulated optical signal from the semiconductor optical amplification unit 110, filtering the received optical signal to be appropriate for a predetermined bandwidth, and outputting a duobinary optical signal.

The light source 101 creates and outputs carrier waves, and can be implemented with a laser diode (LD).

The NRZ data signal generator 102 generates a two-level NRZ data signal, and can be implemented with a PPG for creating electric pulse signals.

The duobinary precoder 103 encodes the two-level NRZ data signal.

The semiconductor optical amplification unit 110 modulates the phase of the optical carrier wave according to an optical amplification gain difference varying with a received current. It is comprised of a DC coupling line 111 for providing a bias current, a semiconductor optical amplifier (SOA) 112, and an optical isolator 113.

The optical BPF 104 receives the phase-modulated optical signal from the SOA 112. Thereafter, it filters the received phase-modulated optical signal to a prescribed bandwidth.

Prior to describing overall operations of the present invention, FIGS. 5 to 8 are used to describe the fundamental principle of the SOA for modulating a phase of a received optical signal in response to an optical amplification gain difference varying with a received current.

Figure 5:
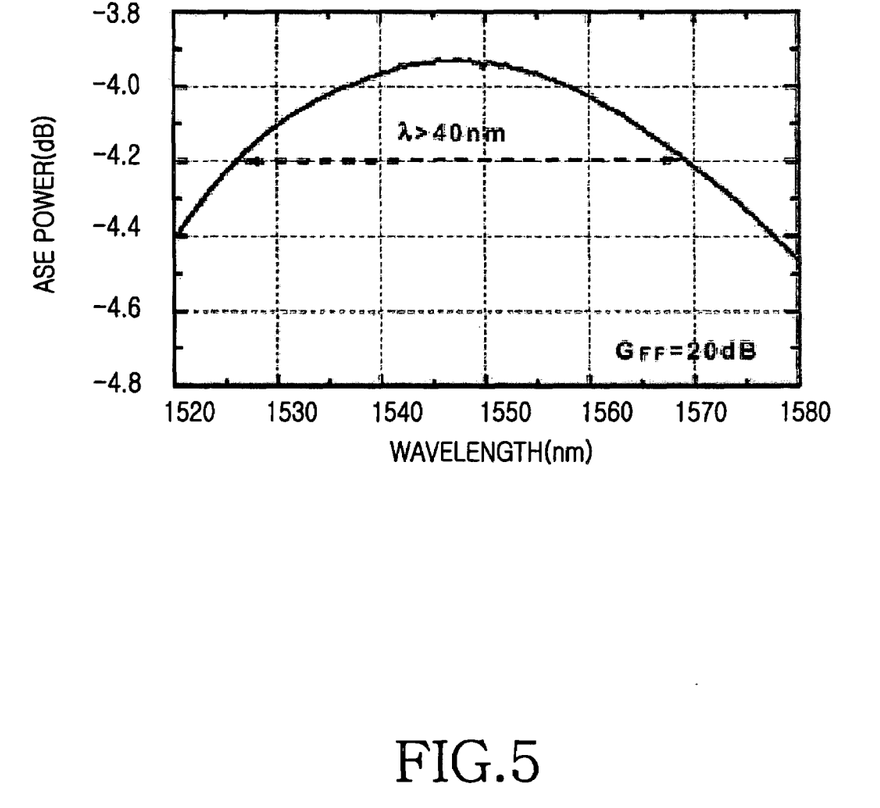
FIG. 5 is a gain distribution graph based on a wavelength of a semiconductor optical amplifier (SOA) in accordance with a preferred embodiment of the present invention.

FIG. 5 is a gain distribution graph based on a wavelength of the semiconductor optical amplifier (SOA) in accordance with a preferred embodiment of the present invention. A prescribed range for selecting an available operation wavelength can be determined with reference to the graph shown in FIG. 5. As shown in FIG. 5, the available operation wavelength is a wavelength range from 1525 nm to 1570 nm.

Figure 6:
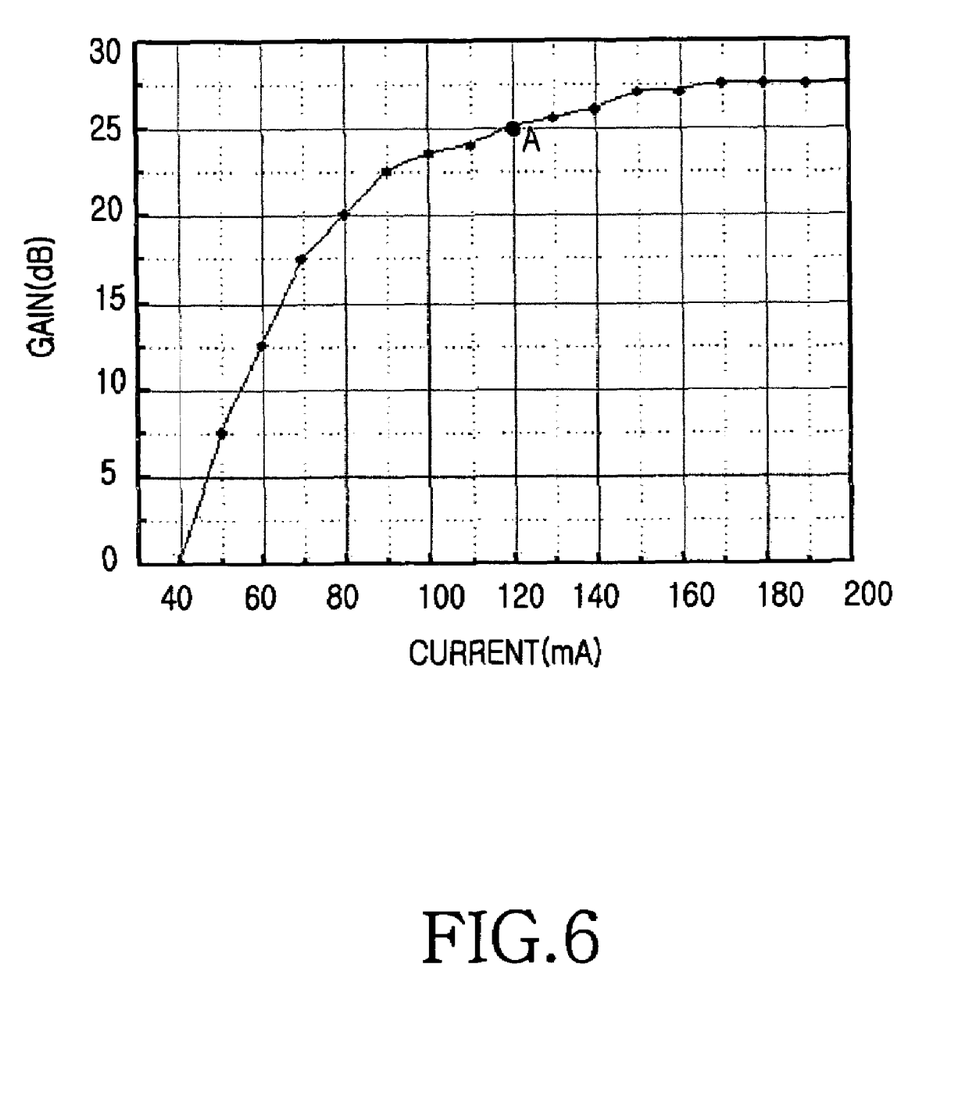
FIG. 6 is a view illustrating variable gain characteristics based on a reception current of the SOA in accordance with a preferred embodiment of the present invention.

FIG. 6 is a view illustrating variable gain characteristics based on a reception current of the SOA in accordance with a preferred embodiment of the present invention. For example, when a bias current of 120 mA is applied to the SOA, a gain difference is set to 25 dB denoted by "A" in FIG. 6. Provided that the optical output of the SOA when no bias current is applied to the SOA is set to −10 dB, an optical output of the SOA when the SOA receives a DC-coupled bias current of 120 mA is set to 15 dB. Amplification gain characteristics vary with the magnitude of a bias current applied to the SOA. A change of the amplification gain characteristics can vary the phase of an optical signal.

Figure 7:
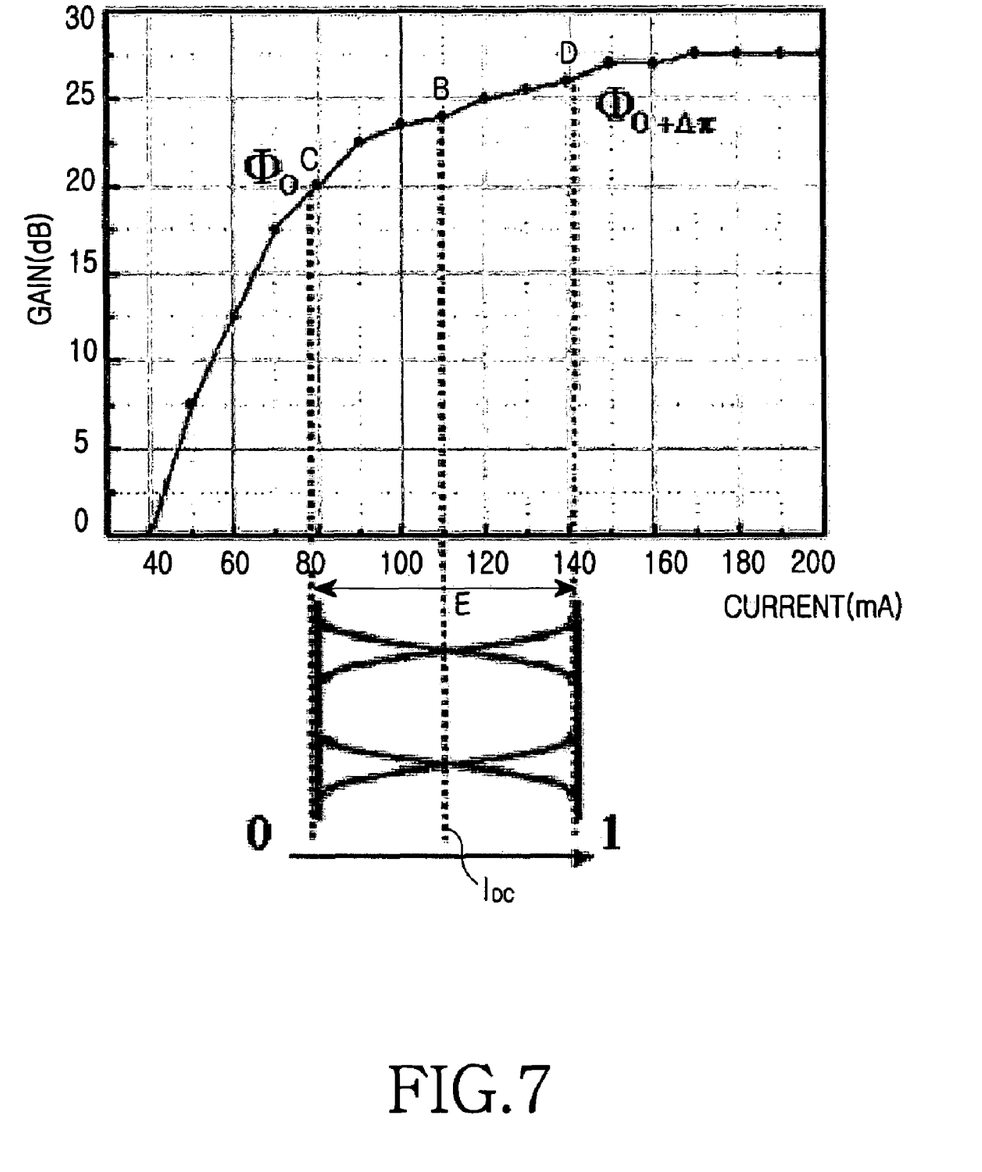
FIG. 7 is a view illustrating a phase modulation technique using the SOA in accordance with a preferred embodiment of the present invention.

FIG. 7 is a view illustrating a phase modulation technique using the SOA in accordance with a preferred embodiment of the present invention. The magnitude E of a received signal of the SOA is increased from 80 mA to 140 mA on the basis of a bias current $I_{DC}$ (i.e., 110 mA) of the SOA. A phase difference of $\pi$ is created in the range from $\phi_0(C)$ to $\phi_{0+\pi}(D)$ on the basis of a specified point B of a gain difference characteristic curve. In this case, the magnitude E of the received signal is set to a modulation index of the SOA. Phase variance characteristics of an optical signal can be adjusted using the magnitude E of the received signal.

Figure 8:
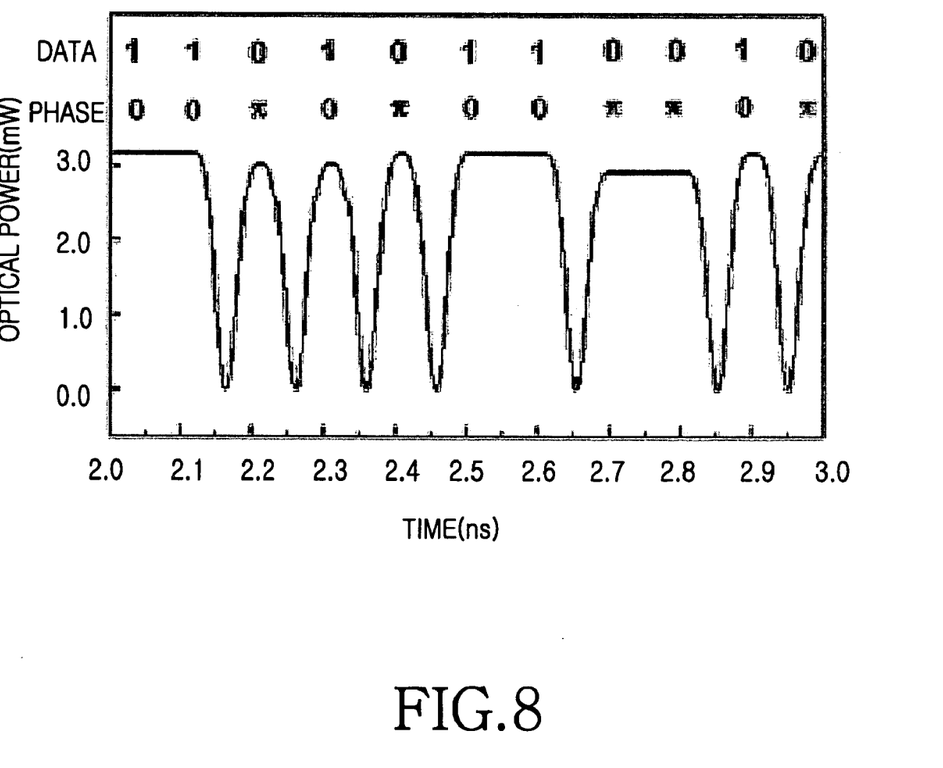
FIG. 8 is a view illustrating a bit sequence of phase-modulated optical signals in accordance with a preferred embodiment of the present invention.

FIG. 8 is a view illustrating a bit sequence of phase-modulated optical signals in accordance with a preferred embodiment of the present invention. In the case of modulating a bit 0 or 1, the bit 0 or 1 is converted into phase information of a phase 0 or $\pi$ in an electric field.

Returning now to FIG. 4, in operation a carrier wave generated from a laser source 50 is applied to a SOA 112 having a DC coupling line. NRZ-type electric signals created from the NRZ-data signal generator 102 are applied to a duobinary precoder 103. They are combined with a bias DC current $I_{DC}$ at a section 111, and are applied to the SOA 112. In this case, if the received current is changed to another current, the amplification gain characteristics of the SOA are also changed. This results in a phase change in the optical signal. If a phase shift keying (PSK)—processed optical output signal passes through an optical BPF 104, which has a bandwidth is 0.7 times a data transfer bit rate, a function equal to a method for adapting a LPF of a conventional duobinary transmitter is performed. Therefore, the optical signal generated from the optical BPF 104 is converted into a duobinary signal. Although a bandwidth of the optical BPF 104 is exemplarily set to 0.7 times a data transfer bit rate, the present invention can adjust the transmission characteristics of the duobinary optical signal by adjusting the bandwidth of the optical BPF 104. The optical isolator 113 minimizes the possibility of operation such that an output optical signal generated from the SOA 112 is reflected and propagated inversely.

Figure 9:
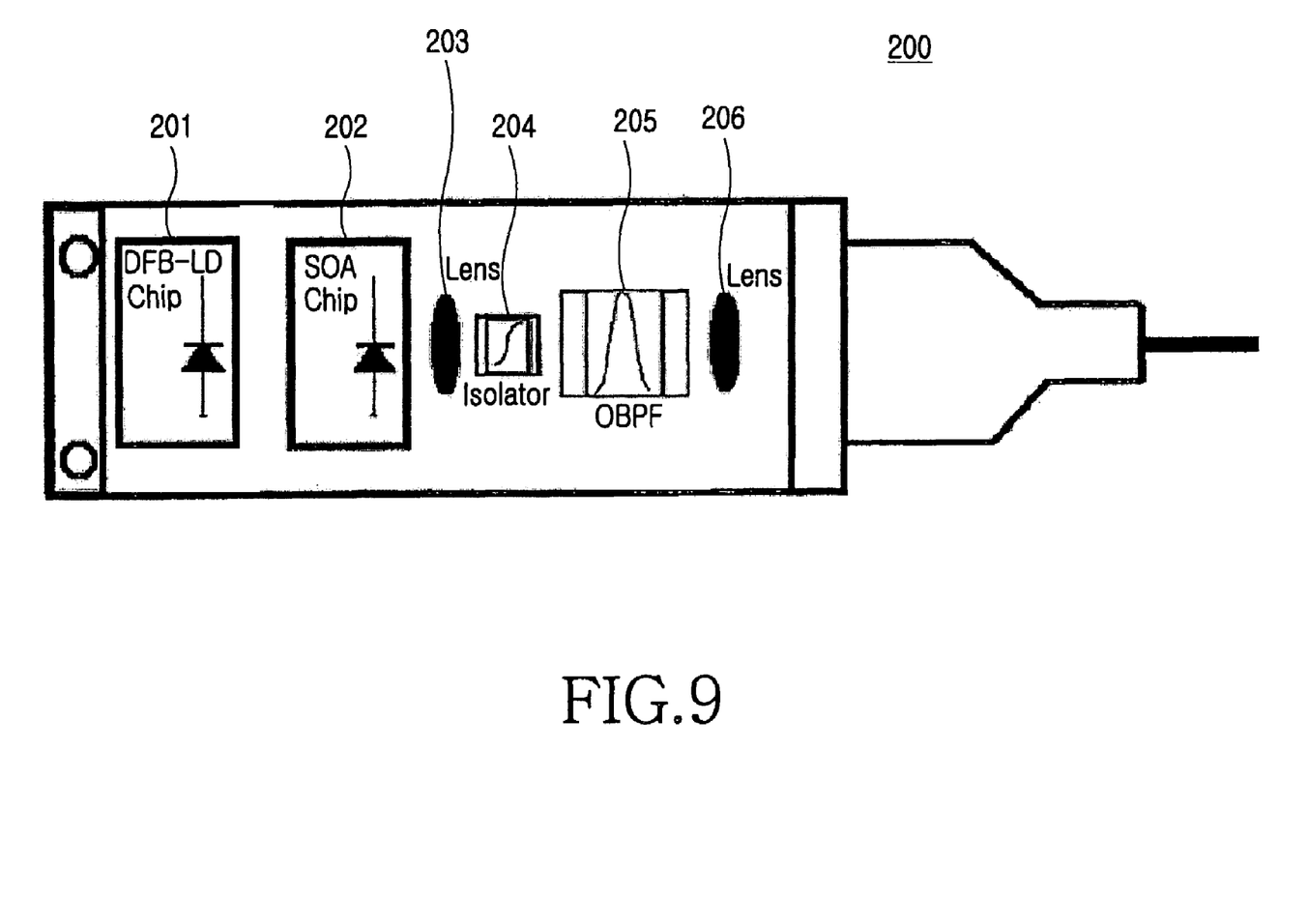
FIG. 9 is a view illustrating the appearance of a duobinary optical transmitter having a single integrated circuit in accordance with a preferred embodiment of the present invention.

FIG. 9 is a view illustrating the appearance of a duobinary optical transmitter 200 having a single integrated circuit in accordance with a preferred embodiment of the present invention. As can be seen from FIG. 9, the SOA 202 is implemented with a single IC configuration along with a semiconductor laser 201 and an optical BPF 205, etc. Reference number 203 indicates a focusing lens, reference number 204 indicates an optical isolator, and reference number 205 indicates a coupling lens.

Advantageously, as is apparent from the above description, the duobinary optical transmission apparatus according to the present invention (1) has the crossed phase characteristics of a duobinary signal using a SOA, (2) an optical BPF instead of an electric LPF, and (3) can be implemented with a single integrated circuit configuration along with a semiconductor laser and an optical BPF, etc. Therefore, the present invention can implement a transmission end which has a smaller size and a higher integration degree as compared to a conventional duobinary optical transmitter using an external modulator or a Mach-Zehnder-interferometer-type optical intensity modulator (MZ MOD). Further, the present invention reduces or overcomes the limitations of transmission quality. Thus, a high-speed and high-density WDM optical transmission system can be easily implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A duobinary optical transmission apparatus comprising:
 a light source for generating a carrier wave;
 a duobinary precoder for encoding an input electric signal;
 a semiconductor optical amplification unit having a semiconductor optical amplifier and a DC coupling line to provide the semiconductor optical amplifier with the bias current to amplify the encoded signal from the duobinary precoder, wherein the amplification unit receives an optical amplification gain difference that varies with a bias current combined with the encoded signal; and
 an optical band pass filter for receiving a phase-modulated optical signal from the semiconductor optical amplification unit, filtering the received optical signal to a prescribed bandwidth.

2. The duobinary optical transmission apparatus as set forth in claim 1, wherein the input electric signal is a non return to zero electric signal.

3. The duobinary optical transmission apparatus as set forth in claim 2, wherein the optical band pass filter generates a duobinary optical signal.

4. The duobinary optical transmission apparatus as set forth in claim 3, wherein the optical band pass filter controls transmission characteristics of a duobinary optical signal by adjusting its own bandwidth.

5. The duobinary optical transmission apparatus as set forth in claim 3, wherein the light source is a semiconductor laser.

6. The duobinary optical transmission apparatus as set forth in claim 5, wherein the semiconductor optical amplifier has a single integrated circuit configuration along with the semiconductor laser and the optical band pass filter.

7. The duobinary optical transmission apparatus as set forth in claim 1, wherein the semiconductor optical amplification unit further includes an optical isolator to prevent an optical signal from being reflected at an output end of the semiconductor optical amplifier.

8. The duobinary optical transmission apparatus as set forth in claim 1, wherein the semiconductor optical amplification unit controls phase difference characteristics of an optical signal by adjusting a modulation index of the semiconductor optical amplifier.

* * * * *